United States Patent [19]
Curtis

[11] Patent Number: 5,582,131
[45] Date of Patent: Dec. 10, 1996

[54] GATE DEVICE FOR LIVESTOCK FEEDERS

[76] Inventor: Marland G. Curtis, E. 5825 Railroad, Spokane, Wash. 99212

[21] Appl. No.: 415,495

[22] Filed: Apr. 3, 1995

[51] Int. Cl.⁶ ............................... A01K 5/02; A01K 1/10
[52] U.S. Cl. ................... 119/51.11; 119/51.12; 119/60; 119/63
[58] Field of Search ................ 119/51.11, 51.12, 119/58, 59, 60, 63, 62; 160/2; 49/58, 59, 60, 199, 356

[56] References Cited

U.S. PATENT DOCUMENTS

| | | | |
|---|---|---|---|
| 241,234 | 5/1881 | North | 119/59 |
| 907,227 | 12/1908 | Eaton . | |
| 907,264 | 12/1908 | Moore | 119/63 |
| 1,022,309 | 4/1912 | Elliott | 119/51.12 |
| 1,187,307 | 6/1913 | Grossman | 119/63 |
| 2,416,520 | 2/1947 | Frankel | 119/51.12 |
| 2,534,608 | 12/1950 | Lasater | 119/62 |
| 2,795,209 | 6/1957 | Lewis | 119/63 |
| 3,180,316 | 4/1965 | Chatfield et al. | 119/51.12 |
| 3,187,720 | 6/1965 | Stoltzfus | 119/51.12 |
| 3,638,618 | 2/1972 | Strother | 119/51.12 |
| 4,303,040 | 12/1981 | Mann | 119/62 |
| 4,706,609 | 11/1987 | Delichte | 119/60 |
| 4,949,675 | 8/1990 | Parks | 119/51.11 |
| 5,345,893 | 9/1994 | Morris | 119/51.11 |
| 5,353,740 | 10/1994 | Pellerin | 119/57.92 |
| 5,377,620 | 1/1995 | Phillippi | 119/51.12 |

FOREIGN PATENT DOCUMENTS 1195304  6/1970  United Kingdom ............... 119/51.11

*Primary Examiner*—Todd E. Manahan
*Attorney, Agent, or Firm*—Wells, St. John, Roberts, Gregory & Matkin, P.S.

[57] ABSTRACT

A livestock feeder gate is described for removable mounting to an existing livestock feeder. The gate includes a closure having a peripheral wall enclosure extending between open top and bottom ends. The closure is shaped to be slidably received over the livestock feeder and is moveable thereon between an open position to permit livestock access to the livestock feeder, and a closed position blocking livestock access to the livestock feeder. A lift is mounted to the closure and is connectable to the feeder, for moving the closure between the open and closed positions. A timer controls operation of the lift.

17 Claims, 4 Drawing Sheets

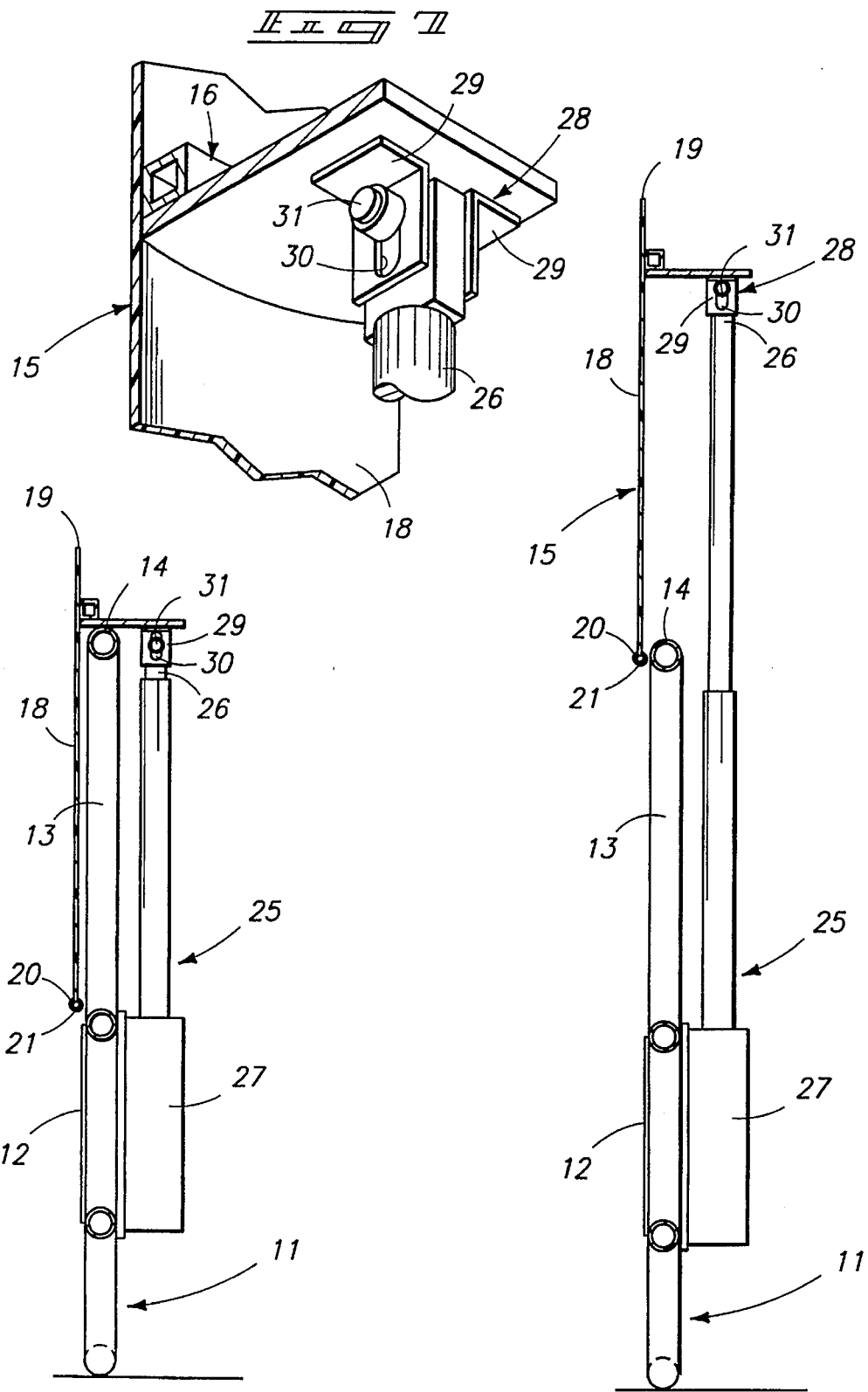

5,582,131

GATE DEVICE FOR LIVESTOCK FEEDERS

TECHNICAL FIELD

The present invention relates to control of livestock feeding through livestock feeders.

BACKGROUND OF THE INVENTION

Many livestock feeders include a peripheral wall enclosure with head and neck stocks enclosing an area for receiving feed such as hay, and for allowing access to livestock for feeding.

The feeders serve the useful purpose of receiving and holding feed in a central location. However, no provision is made for controlling access to the feeders, or for timing the feedings. The result is often that the livestock will continue feeding so long as feed is available. Overfeeding is dangerous for some animals. Further, this often results in the feed being pulled from the feeder and strewn across the ground, wasting the feed.

A solution is to portion the amount of feed in accordance with the number of animals feeding, and to time delivery of the individual portions to the feeder. This is a difficult and time consuming task.

The present invention offers a solution to the above problems by providing a gate mountable to a feeder with a lift that can be selectively operated to permit controlled access to the feeder. This allows for the feeder to be filled less often, while enabling controlled feed times. The result is fewer trips to the feeder to replenish the feed, and more efficient, controlled feeding times.

This and other objects and advantages of the present invention will become apparent from the following description of a preferred form of the invention.

BRIEF DESCRIPTION OF THE DRAWINGS

Preferred embodiments of the invention are described below with reference to the accompanying drawings, which are briefly described below.

FIG. 5 is an enlarged fragmented view showing the gate in the closed position;

FIG. 6 is a view similar to FIG. 5 only showing the gate in an open position;

FIG. 7 is an enlarged fragmented view of an over-travel mechanism for the lift of the present gate.

DETAILED DESCRIPTION OF THE PREFERRED EMBODIMENTS

Figure 1:
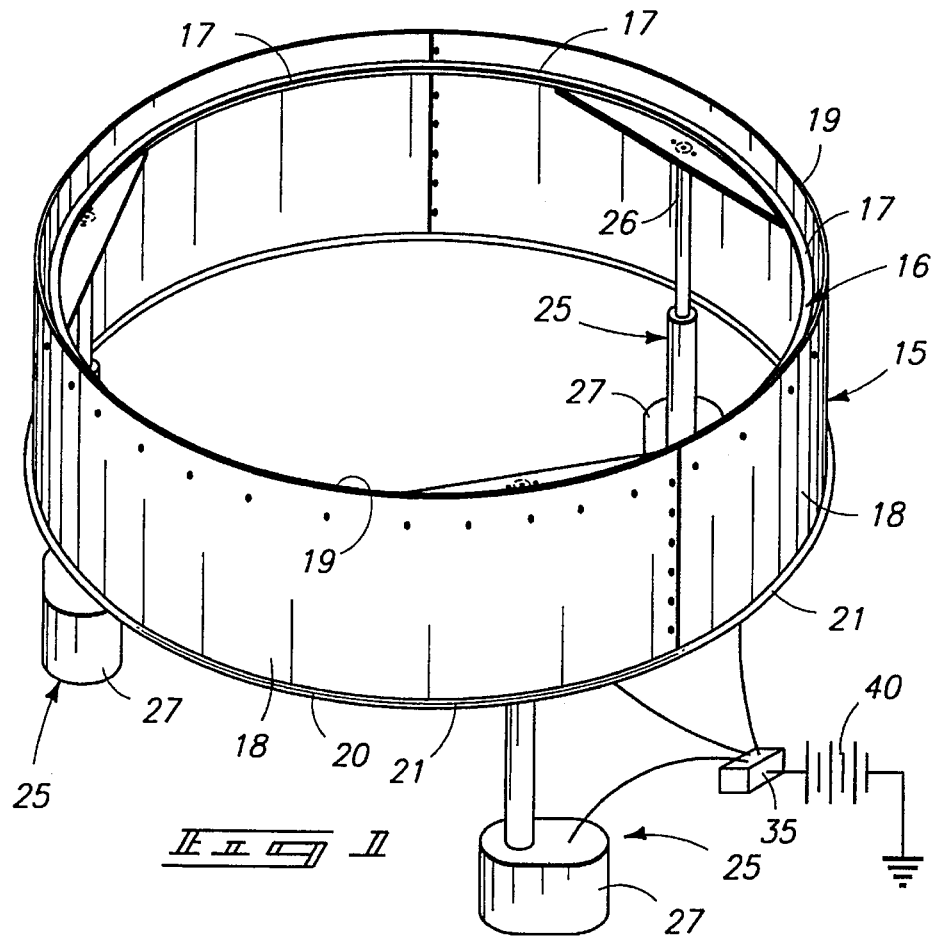
FIG. 1 is a perspective of a first preferred form of the present livestock feeder gate.

This disclosure of the° invention is submitted in furtherance of the constitutional purposes of the U.S. Patent Laws "to promote the progress of science and useful arts" (Article 1, Section 8).

A gate device is generally designated in the drawings by the reference numeral 10, adapted to be mounted to a livestock feeder 11.

The invention may be provided separately from the feeder 11, or may be constructed and sold in combination with the feeder.

Figure 8:
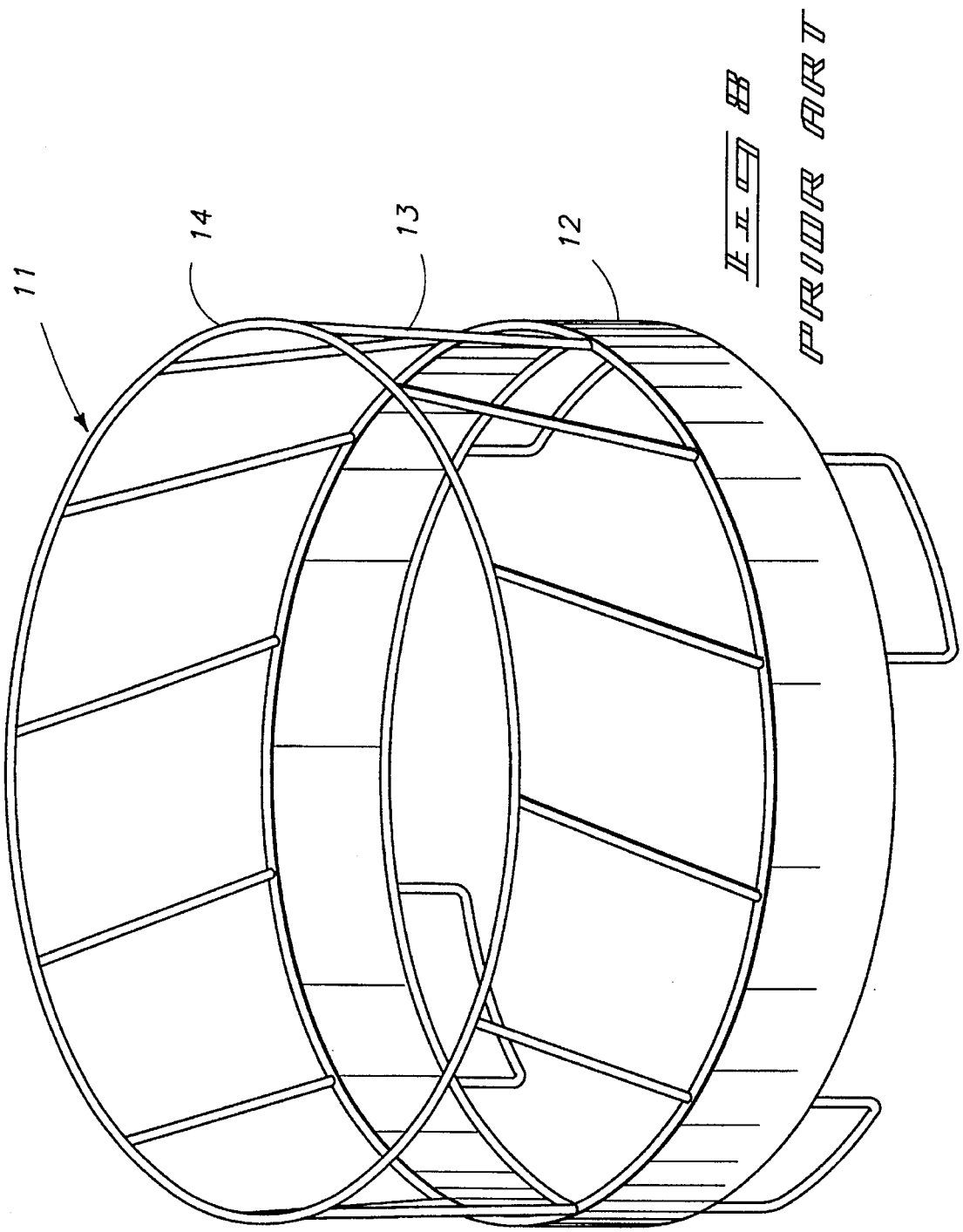
FIG. 8 is a perspective view of a prior art form of livestock feeder.

A common prior art feeder 11 is shown in FIG. 8, having a peripheral wall enclosure 12 typically formed of sheet metal covered rigid tubing. The enclosure includes head stocks 13 for admitting the head and necks of livestock for feeding purposes. The head stocks are typically also formed of welded tubing and extend to top ends 14 that define an open top of the feeder.

The feeder 11 shown is round. However such feeders may also be otherwise formed. Oblong, square or any combination of many sided configurations may be used to define an enclosed area for receiving feed. The head stocks 13 may also take various forms, to allow limited access to a desired number of animals. Whatever the feeder form, the present gate device 10 can be adapted to a similar shape to slidably fit over the head stocks 13.

Figure 2:
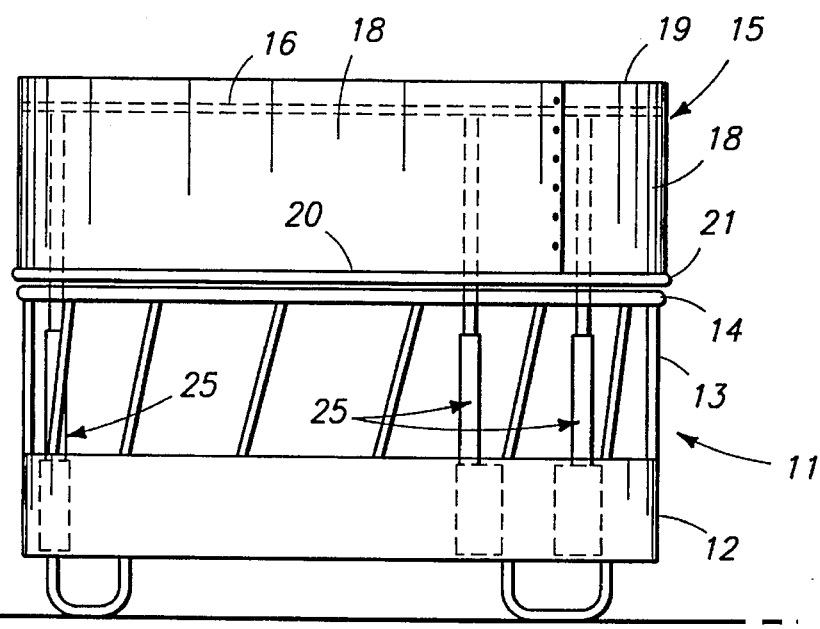
FIG. 2 is a side elevation view of the present gate mounted on a feeder and in an open position.
Figure 3:
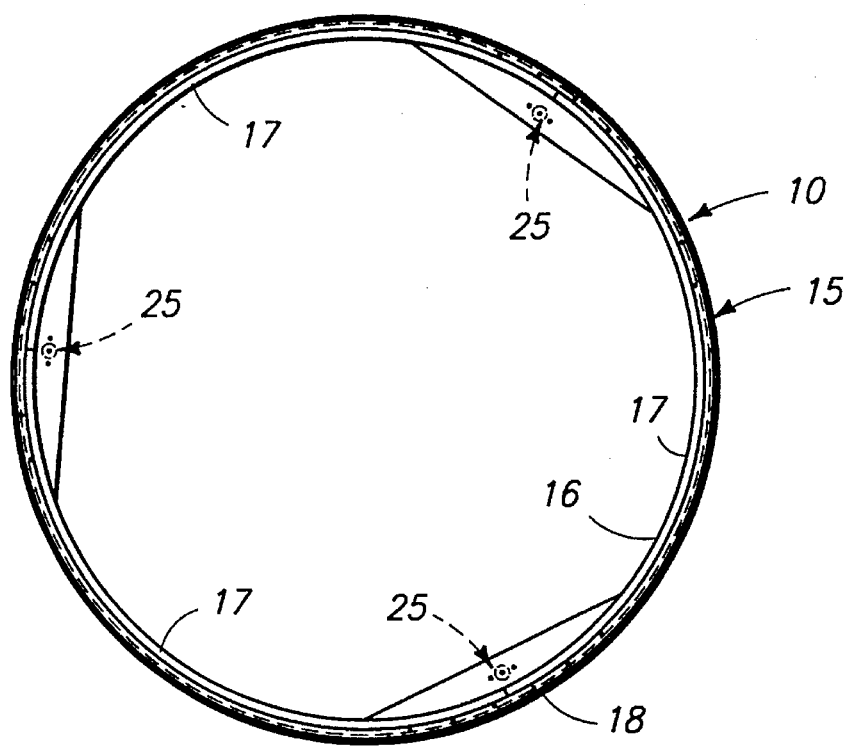
FIG. 3 is a top plan view of the gate.

A preferred form of the present gate device 10 is shown to match the circular form of the conventional feeder 10 shown in FIG. 8. It includes a closure 15 of peripheral shape similar to that of the peripheral wall enclosure 12. The closure 15 is slidably receivable over the peripheral wall enclosure 12. It is moveable on the feeder 11 between an open position (FIGS. 2 and 6), to permit access to feed within the enclosure through the head stocks 13, and a closed position (FIGS. 4 and 5) blocking access through the head stocks.

In one preferred form, the closure 15 includes a rigid frame 16, formed of joined sections 17 of rigid frame members shaped in the form of the peripheral wall enclosure 12 of the feeder 11. The frame is slightly sized in relation to the wall enclosure 12, so a portion of the closure 15 will slidably fit over the head stocks 13. The sections may be joined with common fasteners, or may be welded together end-to-end to form a shape complimentary to the peripheral configuration of the feeder.

The closure also includes a sheet 18, mounted to the frame 16 and shaped on the frame 16 in the configuration of the feeder 11. In a preferred form, the sheet 18 is constructed of a flexible material such as rubber belting. However it is to be understood that the sheet 18 could be made of other materials such as plastic, canvas, sheet metal, woven wire, or other appropriate materials. Belting has the advantage however of safety to the livestock (due to its flexible nature), corrosion resistance, ease in forming, durability, and is readily accessible in long strips or rolls.

The sheet 18 may be continuous about the frame 16, or be provided in joined sections. In either form, the sheet may be attached to the frame 16 by common fasteners such as screws, bolts, rivets, shackle bolts, glue, or by use of any other appropriate conventional fastener technology.

The sheet 18, when attached to the frame 16, defines a tubular configuration, extending axially from an open top edge 19 to a similarly shaped open bottom edge 20. The axial distance between the open top edge 19 and the open bottom edge 20 is similar to the height of the head stocks 13. Thus when fitted to the feeder and moved to the closed position (FIGS. 2, 5), the sheet will cover and close the head stocks 13, denying livestock access to the contents of the feeder.

A bead 21, preferably of flexible material such as slit rubber hose, is mounted to the bottom edge 20 of the sheet.

The bead 21 is provided as a safety measure to avoid injuring livestock as the closure 15 is moved from the open to the closed position.

In general terms, a lift 25 is mounted to the closure 15 and is operable to move the closure 15 over the feeder 11 between the open and closed position. The lift 25 extends between a lift end 26, mounted to the closure 15 and a base end 27 that is adapted to be mounted to the feeder 11. Though not shown, the base end 27 could alternatively be mounted to the closure 15 and the lift end 26 could be mounted to the feeder 11.

In a preferred form, the lift 25 is comprised of a series of linear actuators, such as those produced by "Van Weise" for use as satellite dish linear actuators, as described and available through the 1994 general catalog no. 385 of "Grainger", at page 231. Such actuators, being commercially available, will not be discussed in detail herein, except to note that such actuators are available with built-in limit switches (not shown). Such switches can be adjusted to limit linear travel, thereby allowing for stroke adjustment to set the open and closed positions of the closure 15. Such switches typically are used to turn the actuators off at the set extension and retraction positions.

The linear actuators described above are preferred for use in the present gate device 10. However, other lift apparatus might also be used. For example, screw jacks, hydraulic or pneumatic rams, chain or cable lifts, or other similar lift devices could also be used.

In the preferred example described herein, the linear actuators are equi-angularly spaced about the closure to avoid racking of the closure or angular misalignment as it is moved between the open and closed positions. In the preferred form illustrated, three such actuators are used, with the motorized drive bases mounted inside the feeder by conventional fasteners. Electrical power for the actuators may be supplied by battery, solar cells, household current, or any combination thereof. A battery 40 is shown graphically in FIG. 1 as one example of such a power source.

In the preferred form illustrated lost motion connections 28 are provided between the lift ends 26 of the lifts and the closure 15 for permitting over-travel of the lift ends 26 at the closed position of the closure. One of the connections 28 is shown in detail in FIG. 7.

The connections 28 each include brackets 29 mounted to the closure frame 16. The brackets include upright slots 30 through which pins 31 are slidably engaged. These same pins 31 are attached to the lift ends 26. The pins 31 will slide to the closed tops of the slots to engage the brackets and lift the closure 15 as the actuators are extended. However, when the frame comes to rest against the top ends 14 of the head stocks (FIG. 5) as the actuators are retracted to lower the closure, the pins are allowed to slip downwardly in the slots. This provision allows for some slight deviation in actuator stroke lengths and thus assures that all will trip their bottom "off" limit switches after the closure reaches the bottom closed position.

A timer 35 is shown in FIG. 1 in graphic form, electrically connected to the several actuators to facilitate simultaneous activation of the linear actuators at selected timed intervals. The timer may be selected from conventionally available units, or constructed using common control technology. Use of a timer is advantageous to allow selected times at which the feeder is "opened" to allow feeding, and to limit the feeding times. This is especially advantageous when the device is used for animals that require close attention to avoid over feeding.

It is pointed out above and emphasized here that the present gate device may be produced in sections. This facilitates shipping and assembly on existing feeders 11. Such sections, including frame sections 17 and sheet sections can be made in sub assemblies, then bolted or otherwise secured together before the device is mounted to a selected feeder 11. Alternatively the installer may wish to assemble the gate device in sections on the livestock feeder. In either manner, the present invention is relatively easily installed on existing livestock feeders using ordinary tools.

In instances where the gate device 10 is to be constructed and sold in combination with a feeder 11, the frame and sheet may be formed as continuous members in the shape of the feeder, or in sections as discussed above, if the livestock feeder is produced in sections for assembly by the purchaser.

Description of operation of the present invention will begin assuming the closure 15 to be in the down, closed position, and assuming a timer 35 has been preset to actuate the linear actuators to open the closure at, say 5:00 pm and to close at 5:30 pm. At 5:00 pm, the timer will activate the linear actuators simultaneously to extend. The extending actuators will lift the closure 15 upwardly to the position shown in FIG. 2, exposing the head stocks 13 and permitting the livestock in the area to feed. At the open position, the internal limit switches within the linear actuators will be engaged to turn the lifts off. The closure will thus remain in the up position and feeding can continue from 5:00 pm until 5:30 pm when the timer again activates the linear actuators, this time to lower the closure.

Figure 4:
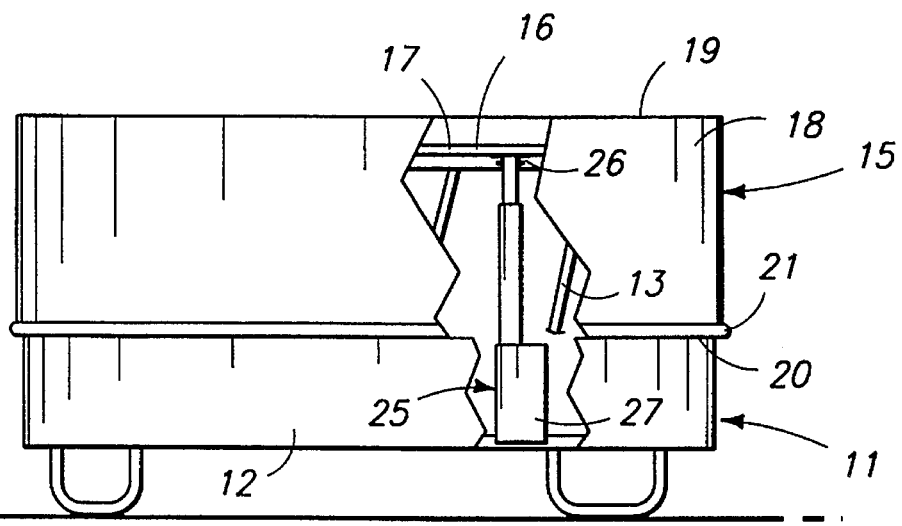
FIG. 4 is a side elevation view of the present gate mounted on a feeder and in a closed position.

The closure will now slide down over the head stocks 13 to the closed position (FIG. 4). If animals are feeding as the head stocks are lowered, the bottom bead 21 will bump the backs of their necks and, it has been found, the animals will withdraw from the head stocks.

The lost motion connections 28 are helpful in the above circumstance, to allow some movement of the actuators relative to the closure, so only a part of the weight of the closure will be born any animals still feeding as the closure is lowered. The full force of the actuators will therefore not immediately come to bear on the animal, and the animal will be given time to retract its head from the feeder. Of course, an occasional stubborn animal might ignore the weight of the closure. In such instances, the flexible nature of the sheet 18 will serve to avoid injuring the animal.

When clear, the closure will continue on downwardly until the frame 16 comes to rest on the top ends 14 of the head stocks 13, with the sheet 18 completely covering the head stocks to prevent further feeding. As the frame 16 comes to rest on the head stocks 13, the lost motion connection 28 will again function to allow downward over-travel of the lifts 25 if the internal "down" limit switches of any lifts 25 have not yet been engaged to turn the lifts off.

In addition to or in place of timed control, the present gate device may be selectively controlled by the operator through common circuitry to open and close as desired with or without regard to timing of feeding.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A gate device for a livestock feeder having a peripheral wall enclosure for receiving feed, and including head stocks for permitting access by the head and necks of livestock for feeding, comprising:

a closure of continuous peripheral shape complementary to that of the peripheral wall enclosure slidably receivable over and encompassing the peripheral wall enclosure and translationally moveable thereon between an open position to permit access to feed within the enclosure through the head stocks, and a closed position blocking access through the head stocks; and a lift mounted to the closure and operable to translationally move the closure over the feeder between the open and closed positions.

2. The gate device for a livestock feeder as claimed by claim 1 wherein the closure is formed of joined sections of flexible material.

3. The gate device for a livestock feeder as claimed by claim 1 wherein the lift is comprised of a plurality of linear actuators, each including a lift end and a base end.

4. The gate device for a livestock feeder as claimed by claim 1 wherein the lift is comprised of a plurality of linear actuators, each including a lift end and a base end and wherein the lift ends are mounted to the closure and the base ends are mountable to the feeder.

5. The gate device for a livestock feeder as claimed by claim 1 wherein the lift is comprised of a plurality of linear actuators, each including a lift end, and further comprising lost motion connections between the lift ends and the closure for permitting over-travel of the lift ends at the closed position of the closure.

6. The gate device for a livestock feeder as claimed by claim 1 wherein the closure is comprised of:

a rigid frame formed in the shape of the peripheral wall enclosure of the feeder; and a sheet mounted to the rigid frame and shaped on the frame in the configuration of the peripheral wall enclosure.

7. The gate device for a livestock feeder as claimed by claim 1 wherein the closure is comprised of:

a rigid frame formed in the shape of the peripheral wall enclosure of the feeder;

a sheet mounted to the rigid frame and shaped on the frame in the configuration of the peripheral wall enclosure; and wherein the sheet is formed of flexible rubber belting.

8. The gate device for a livestock feeder as claimed by claim 1 and further comprising a timer connected to the lift for timed operation of the lift.

9. The gate device for a livestock feeder as claimed by claim 1 wherein the closure is comprised of:

a plurality of releasably interconnected rigid frame sections connected to form the shape of the peripheral wall enclosure of the feeder; and a plurality of sheets mounted to the rigid frame sections, each being shaped on the frame section in the configuration of a portion of the peripheral wall enclosure.

10. A livestock feeder gate for removable mounting to an existing livestock feeder, comprising:

a closure having a endless peripheral wall extending between open top and bottom ends, shaped to be slidably received over a livestock feeder and translationally moveable thereon between an open position to permit livestock access to the livestock feeder and a closed position blocking livestock access to the livestock feeder; and a lift mounted to the closure for translationally moving the closure between the open and closed positions.

11. The livestock feeder gate as claimed by claim 10 wherein the closure is formed of joined sections of flexible material.

12. The livestock feeder gate as claimed by claim 10 wherein the closure is comprised of:

a rigid frame; and a flexible sheet of as rubber belting mounted to the rigid frame.

13. The livestock feeder gate as claimed by claim 10 wherein the closure is formed of joined sections of flexible rubber belting; and wherein the lift is comprised of a plurality of linear actuators mounted to the joined sections.

14. A livestock feeder with a selectively operable closure gate, comprising:

a peripheral wall enclosure for receiving feed head stocks on the peripheral wall enclosure for permitting access by the head and necks of livestock for feeding;

a closure of continuous peripheral shape complementary to that of the peripheral wall enclosure slidably receivable over the peripheral wall enclosure and translationally moveable thereon between an open position, to permit access to feed within the enclosure through the head stocks, and a closed position blocking access through the head stocks; and a lift mounted translationally between the closure and peripheral wall enclosure and operable to move the closure between the open and closed positions.

15. The livestock feeder as claimed by claim 14 wherein the closure is comprised of:

a rigid frame; and a flexible sheet of material mounted to the rigid frame.

16. The livestock feeder as claimed by claim 14 wherein the lift is comprised of:

a plurality of linear actuators mounted between the closure and peripheral wall enclosure.

17. The livestock feeder as claimed by claim 14 further comprising a timer operably connected to the lift for timed operation to actuate the lift to move the closure between the open and closed positions.

* * * * *